United States Patent [19]

Jarowenko

[11] 3,912,715

[45] Oct. 14, 1975

[54] PROCESS FOR PREPARING NOVEL CATIONIC FLOCCULATING AGENTS AND PAPER MADE THEREWITH

[75] Inventor: Wadym Jarowenko, Plainfield, N.J.

[73] Assignee: National Starch and Chemical Corporation, Bridgewater, N.J.

[22] Filed: June 20, 1974

[21] Appl. No.: 481,213

Related U.S. Application Data

[63] Continuation-in-part of Ser. No. 374,466, June 28, 1973, abandoned, which is a continuation-in-part of Ser. No. 240,279, March 31, 1972, abandoned.

[52] U.S. Cl............... 260/233.3 R; 162/175; 260/9; 260/15; 260/17.3; 260/211; 260/213; 260/212; 260/215; 260/233.3 A
[51] Int. Cl.$^2$.......................................... C08B 31/08
[58] Field of Search...... 260/233.3 R, 233.3 A, 212, 260/211, 213, 215, 9, 15, 17.3

[56] References Cited
UNITED STATES PATENTS 3,666,751   5/1972   Jarowenko...................... 260/233.3
3,674,725   7/1972   Aitken et al..................... 260/233.3

OTHER PUBLICATIONS

Hackh's Chemical Dictionary, 4th edition, p. 312.

*Primary Examiner*—Melvyn I. Marquis
*Attorney, Agent, or Firm*—Thomas B. Graham

[57] ABSTRACT

A process for preparing novel cationic flocculating agents and paper wet-end additives is disclosed wherein water-dispersible polysaccharides, colloidally dispersed in an aqueous alkaline medium are reacted with polyfunctional derivatizing reagents containing cationic groups. The resulting dispersion of derivatized polysaccharide may be used directly without further purification, e.g., as an additive for paper pulp which improves retention of pigment and paper strength.

12 Claims, No Drawings

3,912,715

PROCESS FOR PREPARING NOVEL CATIONIC FLOCCULATING AGENTS AND PAPER MADE THERE-WITH

RELATED APPLICATIONS

This application is a continuation-in-part of my co-pending application Ser. No. 374,466 filed June 28, 1973, which in turn is a continuation-in-part of application Ser. No. 240,279, filed Mar. 31, 1972, both now abandoned, and assigned to the assignee of the instant application.

BACKGROUND OF THE INVENTION

This invention relates to the preparation of novel cationic polysaccharides in the form of colloidal dispersions for use as flocculants or for pigment retention or strength additives in paper manufacture. More particularly, it relates to the preparation of such cationic polysaccharides using polyfunctional derivatizing reagents.

As used herein, the term "paper" includes sheet-like masses and molded products made from fibrous material, which may be derived from natural sources such as cellulose or from synthetics such as polyamides, polyesters, and polyacrylic resins, as well as from mineral fibers such as asbestos and glass. Also included are papers made from combination of cellulosic and synthetic materials as well as from mixtures of cellulose with asbestos and glass fibers. Paperboard is of course, also included within the broad term "paper".

It has been known to add various materials, including starch, to the pulp, or stock, during the papermaking process, prior to the formation of the sheet. The purpose of such additives has been mainly to bind the individual fibers to one another, thus aiding the formation of a stronger paper. Furthermore, in the case of those papers which contain added pigments such, for example as titanium dioxide, calcium carbonate, and the like, it has been known to add materials to the pulp for the specific purpose of retaining a greater proportion of such pigments in the paper (rather than have them drain off in the water that is removed during the formation of the sheet). Such additives are often referred to as "pigment retention agents."

Cationic flocculating agents and paper additives are well known to the prior art and are described in numerous patents and review articles. (See E. F. Paschall, "Production and Use of Cationic Starches," in R. L. Whistler and E. F. Paschall, Eds., Starch: Chemistry and Technology, Vol. II, Academic Press, New York, 1967, PP. 403–422.) Prior art processes for preparing such materials have used derivatizing reagents having one group per molecule reactive with the hydroxyl groups of the starch or gum. According to these processes the polysaccharide is dispersed in an aqueous medium at a relatively high concentration (typically greater than 37%) and reacted with the monofunctional derivatizing agent. Under these conditions, reactions with polyfunctional derivatizing reagents produce cross-linked, insoluble materials. Since flocculating agents must be completely dispersible in water to be effective, the prior art rejected the use of polyfunctional derivatizing agents for introducing cationic groups into polysaccharides such as starch and natural gums to prepare effective flocculants and/or pigment retention agents for paper manufacture.

Likewise, according to prior art processes, the cationic flocculants and papermaking additives are purified and recovered from the reaction mixture by washing and drying. After drying they are packaged and shipped to the site of use, where they are redispersed in water and cooked prior to being added to the paper pulp. The many steps of this procedure result in complexity and relatively high cost.

Reactions of starch with condensation products of ammonia and epichlorohydrin are known and are described in Jarrowenko, U.S. Pat. No. 3,666,751, issued May 30, 1972, and in Australian Pat. No. 404,812, published Aug. 28, 1969, and accepted on Aug. 4, 1970. In the processes disclosed in these patents, some polyfunctional condensates may be formed by condensation of more than one molecule of epichlorohydrin with a single ammonia molecule. This is discussed in the Jarowenko patent.

However, it has now been found that many other polyfunctional reagents, hitherto believed useless for forming polysaccharide derivatives which have utility as flocculants, can be reacted with polysaccharides under the proper conditions to make satisfactory flocculants.

SUMMARY OF THE INVENTION

It is an object of this invention to provide novel flocculants and pigment retention and strength additives for paper manufacture. A further object is to provide such flocculants and additives by reacting starch and other polysaccharides with polyfunctional derivatizing reagents containing cationic groups.

According to this invention novel flocculating agents useful in the manufacture of paper as strength and pigment retention additives are prepared by reacting water-dispersible polysaccharides in relatively dilute colloidal aqueous dispersion with a polyfunctional cationic alkylating agent. The polyfunctional detivatizing agents of this invention are those having at least two functional groups reactive with the hydroxyl groups of the polysaccharide and at least one cationic group.

DESCRIPTION OF THE PREFERRED EMBODIMENTS

The water-dispersible polysaccharides which may be used in the novel process of this invention may be of plant or animal origin and include starch and starch fractions such as amylose and amylopectin, derivatized starches, natural gums, microbial gums, and soluble or solubilizable polysaccharides such as hemicellulose, solubilized cellulose, or water-soluble cellulose derivatives such as methylated cellulose, hydroxyethyl cellulose, or hydroxypropyl cellulose. To be suitable for the purpose of this invention these polysaccharides must be capable of forming complete dispersions in water and must have a sufficient number of hydroxyl, amido, or amino groups containing active hydrogen atoms in the molecule to react with an effective amount of derivatizing reagent. The active hydrogen containing groups may be attached to the anhydroglucose nucleus of the polysaccharide as in the case of native starches, cellulose, and natural gums or they may be attached to side chains, perhaps artificially introduced into the polysaccharide molecule, as in the case of hydroxyalkylated, amidoalkylated, or aminoalkylated polysaccharides. Hence, for purposes of this application, "polysaccharide" means any polysaccharide having hydroxyl or other active hydrogen-containing groups either naturally or introduced by derivatization.

Since the flocculating efficiency of a flocculant is usually proportional to its molecular size, the higher molecular weight polysaccharides are preferred as starting materials as long as they are dispersible in aqueous media. Some, such as amylopectin, are dispersible in cold water; others, such as amylose, form gels in cold water, and must be pressure cooked or dispersed in alkaline media. Cellulose may be utilized by forming the xanthate or other water-dispersible derivative.

The starches which may be used as base materials for reaction with a polyfunctional derivatizing reagent may be used in their original native form or in modified forms such as those obtained by controlled degradation (thermal, acidic, or oxidative), etherification and/or esterification, provided that they are still capable of further derivatization into cationic derivatives of the type described below. Thus, starches which have been derivatized with phosphate ester groups can readily be used provided that they still retain reactive hydroxyl groups. Likewise, derivatized starches such as aminoalkylated starches, may be used, provided that they have, either on the anhydroglucose nucleus or the pendent groups, hydroxyl groups or other active hydrogen-containing groups. These starch bases may be derived from any sources including corn, high amylose corn, wheat, potato, tapioca, waxy maize, sago, and rice, as well as from the amylose and amylopectin fractions of starch. The tern "starch" is thus intended to include amylaceous substances, whether modified or unmodified, which still retain free hydroxyl groups. These amylaceous materials may be in granular form or in cold water swelling form as, for example, pregelatinized starches and dextrins. The starch base selected for the preparation of the derivatized starch dispersion will largely depend on the intended end-use of the product.

In the aqueous dispersions of polysaccharides used in the novel process of this invention the polysaccharides must be dispersed as completely as possible so that the dispersions are thin flowing, and free of any gel particles. Satisfactory dispersions are those known as fine colloidal dispersions.

Ideally, the polysaccharides should be molecularly dispersed, but in any case they must be dispersed so that the molecular aggregates are as small as possible. The practitioner will understand that when polysaccharides are reacted with reagents capable of cross-linking the molecules the larger molecular aggregates will be so internally cross-linked as to become indispersible and hence useless as flocculants. Even a large number of larger colloidal particles in the polysaccharide dispersion will cause the resulting flocculant to be inferior. Hence the preferred polysaccharide dispersions are those which approach most closely to the ideal of molecular dispersion. In particular, native starches in granular form must be gelatinized and converted to a fine colloidal dispersion either before the starch is reacted with the derivatizing reagent or simultaneously with such reaction, as may occur when the reaction is carried out in a continuous cooker, as described below. To attain the required high degree of dispersion of the base material well-known physical and chemical techniques such as high-shear agitation, cooking, under pressure if desired, and dispersion in highly alkaline media may be used, as will be understood by the skilled practitioner. The concentration of polysaccharide in the dispersion is also of importance in obtaining the proper degree of dispersion. High molecular weight materials may require concentrations less than than 1.0%, by weight, for satisfactory dispersion, while lower molecular weight materials, e.g., waxy maize degraded to a water fluidity of about 85 may give satisfactory dispersions at concentrations as high as 30% solids. Generally the useful concentrations for polysaccharide dispersions will be less than 4.5% solids.

In any case the concentration of polysaccharide in the dispersion must be low enough so that no agglomerates are formed. These agglomerates are small gel particles which are formed by aggregation of the molecules of the polysaccharide through hydrogen bonds. The gel particles are visible under a microscope or even, in some cases, to the naked eye, Higher molecular weight polysaccharides form such particles at relatively low conentrations, while the lower molecular weight natural polysaccharides or degraded polysaccharides form such agglomerates only at somewhat higher concentrations. Cross-linking of the agglomerated molecules by the polyfunctional reagents used in the process of this invention causes the formation of insoluble particles which are useless as flocculants. Hence these agglomerates must be absent from the polysaccharide dispersion and the concentration of the polysaccharide must accordingly be kept low enough so that no such agglomerates are formed.

The cationic substituent groups which may be introduced in accordance with the novel process of this invention include primary amine groups, secondary amine groups, tertiary amine groups, quaternary ammonium groups, pseudourea groups, phosphonium groups, sulfonium groups, cyclic amino and imino groups such as pyrrole, pyrrolidine, pyridine, piperidine, piperazine, and imidazole groups as well as polyamine, amino-amides, and quanidine groups. It is to be understood that the term "cationic substituent groups" herein is meant to include substituent groups of any of the aforementioned groups or derivatives thereof. The term "cationic polysaccharide dispersions" would thus include dispersions of polysaccharides which contain any of the aforementioned groups regardless of the electrostatic charge of the polysaccharide derivative, which depend on the balance of cationic and anionic groups and the pH of the medium.

The polyfunctional derivatizing reagents used in this invention have at least one such cationic group and two or more groups reactive with the hydroxy groups of the starch molecule. Such reactive groups are known to those skilled in the art and include, for example, halide groups, preferably chlorine groups, epoxides, polyaldehydes, and activated double bonds. Suitable classes of polyfunctional derivatizing reagents include organic ammonium, phosphonium, and sulfonium compounds having at least two functional groups reactive with polysaccharides, amines having at least two non-halohydrin functional groups reactive with polysaccharides said functional groups selected from the groups consisting of chlorine atoms and activated double bonds, and cyclic amines having at least two functional groups reactive with polysaccharides. Particularly preferred reagents are N-beta-chloroethyl-4-(3-chloropropyl) piperidine hydrochloride, tris-beta-chloroethylamine, and formaldehyde-acetone-amine condensates.

These polyfunctional derivatizing reagents may also include crude products of guanidine and various polyamines such as ethylenediamine, 1,3-propanediamine, 1,5-pentanediamine, N,N-dialkylpropanediamine, and diethylenetriamine with polyfunctional reagents having one group reactive with said amine and one group reactive with polysaccharides such as epichlorohydrin, 1,4-dichlorobutene, acrolein, and the like. They may also include crude reaction products of various cyclic amines such as morpholine, imidazole, aminopyridine, and aromatic amines such as aniline and phenylenediamine with a polyfunctional compound such as epichlorohydrin. Any amine compound with at least one amino nitrogen containing at least two reactive hydrogen atoms attached to that nitrogen can be used for the preparation of a polyfunctional aminoalkylating agent by reacting it with more than one mole of epichlorohydrin or other polyfunctional reagent. Useful polyamines include alkylenediamines wherein the alkylene group contains 2 to 6 carbon atoms and substituted alkylenediamines such as N,N-dialkylalkylenediamines and tetraalkyalkylenediamines wherein the total number of carbons in the alkyl groups preferably does not exceed 22. Sulfonium and phosphonium groups may also be included in combination with or instead of amine groups.

It is noted that all of the polyfunctional derivatizing agents useful herein are non-polymeric.

The amount of polyfunctional derivatizing reagent used in the process of this invention is ordinarily the least amount which will produce a satisfactory flocculant. Generally satisfactory results will be obtained using an amount of derivatizing reagent equal to about 3 to 4 per cent, by weight, of the polysaccharide. Larger or smaller quantities can be used, however, if desired.

Since the derivatization reaction is catalyzed by base, the reaction is carried out under alkaline conditions. Furthermore, since the reaction generally produces an acid as a by-product, an excess of base must be added to neutralize the acid and maintain the required basic condition. Any kind of soluble alkali or alkaline salt; including sodium hydroxide, potassium hydroxide, trisodium phosphate, borax, tertiary amines, quaternary amines, and guanidines, can be used. The amount of base required in the reaction mixture to solubilize the polysaccharide, catalyze the derivatizing reaction, and neutralize the evolved acid will vary depending on the reactants and reaction conditions. At least enough base must be used to neutralize the evolved acid. This amount will vary according to the amount of derivatizing agent used, but the equivalent amount can be readily calculated by the practitioner when the amount of derivatizing agent has been decided. Greater amounts can be used and may be preferred in particular cases such as to improve the dispersion of the polysaccharide.

The polyfunctional reagents used to form derivatives of polysaccharides according to this invention are also capable of cross-linking the polysaccharide molecules. Excessive cross-linking can produce insoluble materials which are not useful as flocculants; hence the amount of cross-linking which occurs during the derivatization reaction must be limited.

Cross-linking may be limited by using dilute dispersions of the polysaccharide to be derivatized. The high molecular weight polysaccharides such as native starch must be used in very dilute dispersions since only a small amount of cross-linking need take place to produce an insoluble product. Generally, a concentration of less than 4.5% must be used when undergraded polysaccharides such as native starches are derivatized. Lower molecular weight materials can undergo a greater amount of cross-linking before insoluble materials are produced. Hence, such materials, e.g., degraded starches, may be reacted at concentrations of up to 30%.

The temperature and duration of the reaction can also be controlled to limit the amount of undesirable cross-linking. In general, low temperatures and short reaction times tend to minimize cross-linking. The practitioner will recognize that certain derivatizing reagents are more reactive with the polysaccharides than others and hence are more prone to produce cross-linked products, so that when such reagents are used greater care must be exercised to prevent undesirable cross-linking.

If desired, the reaction of the polysaccharide with the polyfunctional derivatizing reagent may be carried out in the presence of a cross-linking inhibitor which acts to reduce the occurrence of cross-linking during the reaction. Such inhibitors are those compounds which react with one of the reactive groups of the polyfunctional derivatizing reagent to make it unavailable for reaction with the polysaccharide. Useful cross-linking inhibitors are water-soluble compounds containing amino and/or hydroxyl groups, salts of organic acids, or organic halo acids. Suitable compounds are amines such as ammonium hydroxide, ethylamine, and diethylamine; amino alcohols such as ethanolamine and triethanolamine; amides such as formamide and halo acid salts such as sodium chloroacetate. These compounds may be present in a concentration of about 1 to 15%, by weight, based on the weight of the polysaccharide.

The polyfunctional derivatizing reagents may contain reactive groups having equal or different reactivity toward the polysaccharide. Very reactive groups include, for example, N-beta-haloethyl groups, especially N-beta-bromoethyl and N-beta-chloroethyl groups. An example of a reagent with three very reactive groups is tris-beta-chloroethylamine hydrochloride. Groups of intermediate reactivity include the N-3-chloro-2-hydroxypropyl group, while groups of relatively low reactivity include the N-halopropyl and N-halobutyl groups and the reactive groups found in formaldehyde/acetone/amine condensates. The preferred reagents are those containing no more than one highly reactive group and no more than one less reactive group. A preferred reagent of this type is N-beta-chloroethyl-4-(3-chloropropyl)piperidine hydrochloride.

Reagents containing more than one highly reactive group are, of course, very effective cross-linking agents, and precautions must be taken when such reagents are used to avoid undesirable cross-linking of the polysaccharide with consequent production of inferior flocculants. Such cross-linking may be minimized by adding the reagents to dilute, fine colloidal dispersions of the polysaccharides, using low molecule weight polysaccharides which give dispersions of relatively low viscosity, and carrying out the reaction in the presence of cross-linking inhibitors.

When it is desired to prepare a derivative of a polysaccharide such as starch with a polyfunctional reagent which is not too reactive toward the polysaccharide, that is, a reagent containing no more than one group which will react with the polysaccharide as rapidly as the beta-chloroethyl group, the reaction may be conveniently carried out in a continuous cooker. The term "continuous cooker" refers to a type of closed-system equipment well known in the starch processing field and comprises equipment through which a starch slurry is passed continuously. When used to prepare starch derivatives according to the process of this invention, the continuous cooker provides the means of heating the reaction slurry rapidly to temperatures of from about 80° to about 160°C., or higher usually by injecting live steam, so that the starch is discharged in a gelatinized ("cooked") state. The continuous cooker process results in essentially simultaneous gelatinization of the starch and its reaction with the derivatizing reagent to introduce the cationic substituent groups. The continuous cooker process enables the practitioner to prepare the starch product at the site of its eventual utilization and thus to have a continuous flow of product for immediate use.

Accordingly, the reaction of starch with a polyfunctional derivatizing reagent bearing a cationic group may be carried out by mixing the reagent with a slurry of native starch in water at a pH greater than 10.5 and passing the slurry through a continuous cooker at a temperature of 80° to 160°C. or higher. The starch is gelatinized and derivatized at the same time by this treatment and the reaction mixture may be added just as it comes from the cooker to the wet end of the paper making machine. In some cases it may be more convenient to inject the reagent and/or catalyst directly into the continuous cooker chamber or into the stream which emerges from the cooker chamber.

When polysaccharide base materials which do not require gelatinization, such as already gelatinized starch or dispersed cellulose derivatives, are used in the process of this invention, or when the derivatizing reagents for starch are so reactive that they would cross-link the starch while the slurry is in the holding tank before reaction in the continuous cooker, the reaction may be conveniently carried out in an aqueous dispersion at a temperature of 25° to 100°C. and an alkaline pH. The reaction may be terminated before objectionable cross-linking occurs by acidifying the reaction mixture to a pH of 7 or less.

The use of the derivatized polysaccharides of this invention as paper pigment retention and strength additives or as flocculants is entirely conventional. However, the use of the reaction mixtures produced by the process of this invention by adding them directly to the wet end of a papermaking machine eliminates several of the steps usually required to prepare cationic flocculating and strength additives for use in papermaking and thus has economic advantages. The paper made using the derivatives prepared by the process of this invention is of quality comparable to that obtained when conventional pigment retention and strength additives are used.

The derivatized polysaccharides produced by the novel process of this invention are useful not only in papermaking but also as flocculants in water and waste treatment.

The invention will be further illustrated by the following examples which are not, however, intended to limit its scope. All parts given are by weight unless otherwise specified.

EXAMPLE I

This example illustrates the preparation and use of a modified starch according to this invention.

To 60 parts of waxy maize starch slurried in 1940 parts of water were added 4.8 parts of sodium hydroxide and 2.4 parts of N-2-chloroethyl-4-(3-chloropropyl)piperidine hydrochloride. The resulting mixture was passed immediately through a continuous cooker at a temperature of 150°C. at a rate of 100 milliliters of slurry per minute. The resulting colloidal solution had a pH of 11.5 and contained 2.6% solids.

While the colloidal solution was still warm, it was added to a bleached sulfite pulp (freeness 400) in such an amount so as to provide 0.25%, by weight, of solids derived from the derivatized starch dispersion based on the quantity of pulp solids. The pulp also contained 10%, by weight, of titanium dioxide pigment. The pulp was made into sheets of paper by hand. The resulting hand made sheets were ashed, and the pigment residue weighed to determmine what percentage of the pigment had been retained on the paper. The pigment retention percentages for the product of this example compared to those of a control sample made with a pigment retention aid made according to the teachings of Caldwell, U.S. Pat. No. 2,813,093 and a blank containing no pigment retention aid are summarized in Table I.

TABLE I

|  | % pigment retention at pH | |
|---|---|---|
|  | 7.6 | 9.5 |
| Product of Example I | 67 | 61 |
| Product of prior art | 64 | 55 |
| Blank | 12 | 17 |

EXAMPLE II

This example illustrates the preparation of a cationic paper strength and retention additive by the process of this invention involving a very reactive, polyfunctional aminoalkylating agent.

A total of 60 parts of corn starch were suspended in 2940 parts of cold water containing 4.8 parts of sodium hydroxide and the slurry was passed through a continuous cooker at a temperature of 150°C. To this resulting colloidal starch solution there were added with agitation 2.4 parts of tris-betachloroethyl amine hydrochloride and samples were withdrawn after 5, 10, 20 and 30 minutes. Without delay the samples were acidified to pH 3 with hydrochloric acid to stop the reaction, and were then stored in closed jars. The reaction temperature ranged between 95° and 75°C.

The products of each of the samples were added in a ratio of 0.25% solids derived from theh derivatized starch dispersion based on pulp solids to bleached sulfite pulp containing 10% titanium dioxide. The pulp was made into sheets by hand and the sheets were tested for pigment retention as in Example I. Similarly, the products of each of the samples were added at a ratio of 0.5% to 1.5% solids based on pulp solids to bleached Kraft pulp. These pulp samples were made into sheets by hand and the sheets were evaluated for burst strength by the Mullen procedure. The results of the pigment retention and burst strength tests are tabulated in Table II.

TABLE II

| Sample No. | Reaction Time (minutes) | % Pigment Retention at pH 7.6 | Mullen Factor at % on pulp | | |
|---|---|---|---|---|---|
| | | | 0.5 | 1.0 | 1.5 |
| 1 | 5 | 60 | 1.63 | 1.63 | 1.66 |
| 2 | 10 | 61 | 1.59 | 1.66 | 1.74 |
| 3 | 20 | 57 | 1.58 | 1.65 | 1.74 |
| 4. | 30 | 49 | 1.40 | 1.54 | 1.48 |
| Control; prior art product | | 59 | 1.44 | 1.70 | 1.66 |
| Blank | | 23 | 1.32 | | |

These results show that these products have good performance as pigment retention and strength additives, but that the reaction must not be allowed to proceed so long that detrimental cross-linking occurs, that is, about 30 minutes at a temperature of about 70°C.

EXAMPLE III

This example illustrates the preparation of cationic starch pigment retention additives continuous cooker reactions with formaldehyde-acetone-amine condensates.

Preparation of reagents:

A. A total of 20 grams of water ans 0.25 grams of sodium hydroxide were placed in a three-necked round bottom flask equipped with a stirrer, reflux condenser, and additional funnel. To this mixture there were added 5.8 grams of acetone and 17 grams of a 37% aqueous formaldehyde solution. The mixture was then heated to the reflux temperature and kept at that temperature for about 15 minutes. Then 20 grams of N-methypiperazine in 50 grams of water were added and the heating was continued for another 15 minutes. The mixture was diluted to 200 milliliters total volume and stored in jars. The mixture contained about 11% solids.

B. Following the procedure of part A the following ingredients were reacted:

| | |
|---|---|
| Formaldehyde (37% aqueous) | 36.6 grams |
| Acetone | 5.8 grams |
| Sodium hydroxide | 0.5 grams |
| N,N-dimethyl propanediamine | 20.4 grams |
| Water | 50 grams |

The resulting mixture was diluted with water to 200 milliliters volume. It contained 20% solids.

C. Following the procedure of part A the following ingredients were reacted:

| | |
|---|---|
| Formaldehyde (37% aqueous) | 36.6 grams |
| Acetone | 5.8 grams |
| Sodium hydroxide | 0.5 grams |
| Ethylenediamine | 12.0 grams |
| Water | 50 grams |

The resulting mixture was diluted with water to a volume of 200 milliliters. It contained 7.5% solids.

Continuous cooker reactions:

A total of 60 parts of corn starch was suspended in 1940 parts of water containing 2.4 parts of sodium hydroxide. To this slurry there were added 54.5 parts of the solution of product A prepared above and the mixture was passed through a continuous cooker at a temperature of 140°-150°C. at a rate of 100 milliliters per minute. Likewise, to similar amounts of corn starch suspended in water there were added 30.0 parts of the solution of product B and 80.0 parts of product C and the resulting mixtures were passed through a continuous cooker as above.

Samples of the dispersions prepared by the continuous cooker reactions were added at a concentration of 0.25% solids based on pulp solids content to bleached sulfite pulp (400 milliliters freeness) containing 10% titanium dioxide. The pulp samples were made into sheets by hand the sample sheets were ashed and the pigment retention determined as described in Example I. The results of the pigment retention test for each of the three products of this example are tabulated and compared with a prior art product in Table III.

TABLE III

| Retention Aid | % Retention at pH 6 |
|---|---|
| Corn starch reacted with A | 59 |
| Corn starch reacted with B | 53 |
| Corn starch reacted with C | 61 |
| Starch product of prior art | 48-50 |
| Blank | 46 |

EXAMPLE IV

This example shows the reaction of cooked starch with tris-beta-chloroethylamine.

A total of 50 grams of thin boiling (WF 85) amioca was suspended in 200 grams of water and cooked for 20 minutes. The dispersion was cooled to 40°C. and 550 grams of water, 8 grams of a 50% aqueous sodium hydroxide solution, and 4 grams of tris-beta-chloroethylamine were added. The reaction was allowed to proceed for 9 minutes and then was terminated by acidifying the mixture to a pH of 3 by adding hydrochloric acid. Paper samples using the additive of this example in an amount of 0.25% additive solids based on the weight of pulp solids were prepared and tested for pigment retention and strength by the procedure of Example II. Results of these tests compared with a blank sample and a paper made with a commercial cationic starch are summarized in Table IV.

TABLE IV

| | % Pigment Retention at pH 7.5 | Strength Mullen Factor (at 0.5% on pulp solids) |
|---|---|---|
| Product of this example | 51 | 1.71 |
| Commercial cationic starch | 60 | 1.76 |
| Blank | 18 | 1.39 |

In recapitulation, as illustrated, any naturally occurring polymer of carbohydrates having a molecular weight greater than 10,000 is operable in the invention. Lower molecular weight materials may be used; however, greater quantities of derivatizing reagent will be required. This makes the use of such materials economically unattractive. Preferred polysaccharides are those having molecular weights greater than 50,000.

In summary, this invention provides novel flocculants and paper strength and pigment retention additives and improved processes for preparing them.

Variations may be made in procedures, preparations, and materials without departing from the scope of this invention.

What is claimed is:

1. A process for preparing a derivative of a water-dispersible polysaccharide comprising reacting said water-dispersible polysaccharide, colloidally dispersed in an alkaline aqueous medium, under alkaline conditions at a temperature between 25° and 160°C., and at a concentration sufficiently low to prevent the formation of agglomerates
with a non-polymeric derivatizing reagent having at least one cationic group and at least two functional groups reactive with said water-dispersible polysaccharide, said reagent being selected from the group consisting of
organic phosphonium, and sulfonium compounds having at least two functional groups reactive with polysaccharides,
amines containing at least tow non-halohydrin functional groups reactive with polysaccharides, said functional groups selected from the group consisting of chlorine atoms and activated double bonds,
cyclic amines having at least two functional groups reactive with polysaccharides,
condensation products of amine and polyamines with aldehydes and polyaldehydes, and formaldehyde-acetone-amine condensates.

2. A process according to claim 1 wherein said polysaccharide is starch.

3. A process according to claim 2 wherein starch is reacted with said derivatizing reagent in a continuous cooker at a temperature of about 80° to about 160°C. and with a residence time in the cooker of no longer than about 5 minutes.

4. A process according to claim 1 wherein the pH of the mixture is reduced to a level of 7 or below whereby the reaction between said polysaccharide and said derivatizing reagent is teminate after the desired extent of reaction has occurred.

5. A process according to claim 1 wherein said derivatizing reagent is N-beta-chloroethyl-4-(3-chloropropyl) piperidine.

6. A process according to claim 1 wherein said derivatizing reagent is tris-beta-chloroethylamine.

7. A process according to claim 1 wherein there is also present a cross-linking inhibitor in an amount equal to from 1 to 15%, by weight, of said polysaccharide.

8. The derivative of a water-dispersible polysaccharide made by reacting said water-dispersible polysaccharide, colloidally dispersed in an alkaline aqueous medium, under alkaline conditions at a temperature between 25° and 160°C., and at a concentration sufficiently low to prevent the formation of agglomerates
with a non-polymeric derivatizing reagent having at least one cationic group and at least two functional groups reactive with said water-dispersible polysaccharide, said reagent being selected from the group consisting of
organic phosphonium, and sulfonium compounds having at least two functional groups reactive with polysaccharides,
amines containing at least two non-halohydrin functional groups reactive with polysaccharides, said functional groups selected from the group consisting of chlorine atoms and activated double bonds,
cyclic amines having at least two functional groups reactive with polysaccharides,
condensation products of amine and polyamines with aldehydes and polyaldehydes, and
formaldehyde-acetone-amine condensates.

9. A derivative according to claim 8 wherein said polysaccharide is starch.

10. A derivative according to claim 9 wherein starch is reacted with said derivatizing reagent in a continuous cooker at a temperature of about 80° to about 160°C. and with a residence time in the cooker of no longer than about 5 minutes.

11. A derivative according to claim 10 wherein said derivatizing reagent is N-beta-chloroethyl-4-(3-chloropropyl) piperidine.

12. A derivative according to claim 10 wherein said derivatizing reagent is tris-beta-chloroethylamine.

* * * * *